Dec. 22, 1970     B. R. REUTER     3,549,206
SELF-PURGING, PNEUMATIC, CONVEYING APPARATUS ADDITIONALLY
EQUIPPED AS WITH AGITATOR AND/OR SCALE
Filed May 6, 1969     6 Sheets-Sheet 1

Fig. 1

BRIAN R. REUTER
INVENTOR

BY Wm. E. Ford

ATTORNEY

Dec. 22, 1970  B. R. REUTER  3,549,206
SELF-PURGING, PNEUMATIC, CONVEYING APPARATUS ADDITIONALLY
EQUIPPED AS WITH AGITATOR AND/OR SCALE
Filed May 6, 1969  6 Sheets-Sheet 3

Fig. 4

INVENTOR
BRIAN R. REUTER
BY Wm. E. Ford
ATTORNEY

Dec. 22, 1970  B. R. REUTER  3,549,206
SELF-PURGING, PNEUMATIC, CONVEYING APPARATUS ADDITIONALLY
EQUIPPED AS WITH AGITATOR AND/OR SCALE
Filed May 6, 1969  6 Sheets-Sheet 6

BRIAN R. REUTER
INVENTOR
BY Wm. E. Ford
ATTORNEY

United States Patent Office 3,549,206
Patented Dec. 22, 1970

3,549,206
SELF-PURGING, PNEUMATIC, CONVEYING APPARATUS ADDITIONALLY EQUIPPED AS WITH AGITATOR AND/OR SCALE
Brian R. Reuter, Houston, Tex., assignor to Consolidated Engineering Company, Houston, Tex., a corporation of Texas
Continuation-in-part of applications Ser. No. 518,353, Jan. 3, 1966, and Ser. No. 686,018, Nov. 28, 1967. This application May 6, 1969, Ser. No. 822,126
Int. Cl. B65g 53/40
U.S. Cl. 302—53          10 Claims

ABSTRACT OF THE DISCLOSURE

The disclosure is primarily of a self-purging pneumatic conveying pressure vessel with continuity from parent, now patented apparatus of Pat. No. 3,555,221, differing in that material discharge is downwardly from material plenum via conduit through gas plenum, circuitry opening and then closing fill valve, delaying air valve opening and closing purge valve, opening discharge valve, then closing discharge valve and air valve, and opening purge valve. This enables a motor to be mounted upon the pressure vessel to drive an agitator to assure easy material delivery through bottom discharge. In another form the pressure vessel is mounted on a scale and a pressure (weight) sensitive switch closes fill valve, other circuitry is same.

---

The application is a continuation-in-part of Brian R. Reuter application Ser. No. 518,353, filed Jan. 3, 1966, and issued Nov. 28, 1967, as Pat. No. 3,355,221; and also the application is a continuation-in-part of Brian R. Reuter copending application Ser. No. 686,018, filed Nov. 28, 1967, and now abandoned.

One invention relates to self-purging, pneumatic conveying pressure vessels of the type, including an agitator, and which have circuitry opening and then closing fill valve, opening air valve and closing purge valve, opening discharge valve, then closing discharge valve and air valve, and opening purge valve, this preferred form of the invention using the aforesaid circuitry with discharge through the bottom, the motor drive for the agitator being mounted on top. Also, the invention includes a form of pressure vessel of this class which closes the fill valve responsive to weight converted to an air signal transmitted from a scale with relation to which the pressure vessel is mounted, otherwise circuitry being as described.

As a primary object the weight responsive form of invention sets out to provide a means for automatically controlling the cyclic measured entry, activation, full discharging and purge discharging of a material which enters a processing pump or pressure vessel; also to provide for the closing of the fill valve which admits the material being affected by predetermined controlling force or condition, as the material arriving at a predetermined weight in the vessel, or reaching a predetermined level in the vessel or flowing into the vessel for a predetermined time; also to provide for the final return of the vessel for processing a succeeding batch of material being also controlled by factors as aforesaid.

It is also an important object of this form of the invention to provide a means for automatically controlling the cyclic measured entry, activation, full discharging and purge discharge of a material which enters a processing pump or vessel when the vessel is supported on a hopper scale designed to reflect the weight of the material in the vessel in terms of pressure to activate the closing of the fill valve from the hopper, directly upon the deposit of a predetermined weight of material in the vessel.

It is also another important object of this form of the invention to provide solids pumps of this class which are designed to close the fill valve from hoppers responsive to forces or conditions other than the passage of time during which the material enters the vessel from the hopper.

The primary and most important object of the agitated, bottom discharge form of the invention is to provide a self-purging, pneumatic conveying pressure vessel that has the discharge conduit from plenum passed downwardly through the gas plenum and out sidewardly from beneath the pressure vessel.

Also another and most important object of this bottom discharge form of the invention is to provide a pressure vessel of the class described which provides an agitator to agitate the material on the sloped diaphragm between plenums, and thereabove, in manner that the agitated material passes freely down into the aforesaid downwardly passed conduit, this arrangement of central agitator and discharged therebelow permitting the motor drive for the agitator to be mounted substantially upon the top of the pressure vessel.

It is also another object of the agitator-bottom discharge form of the invention to provide a frame type agitator of tubular members, thus streamlined in its contact with materials to be conveyed, and designed to sweep over the shape of the upper surface of the diaphragm through which passes the activating gas, as air, while stirring through the material thereabove.

It is yet a further object of the agitator-bottom discharge form of the invention to provide a frame type agitator with upper members designed to agitate a frusto-conically shaped space of materials, while at the same time spaces are provided at the bottom whereby the activated and agitated materials, as pressurized, may pass downwardly centrally through such spaces into a down drop conduit through the gas plenum and forming part of the discharge conduit.

It is also another and important object of the invention to provide means for mounting a motor drive on top of the pressure vessel in manner to drive a gear reduction box disposed centrally on top for connection to the vertical drive shaft of the agitator which is passed upwardly, sealably through the top of the pressure vessel.

Other and further objects will be apparent when the specification herein is considered in connection with the drawings, in which.

Figure 1:
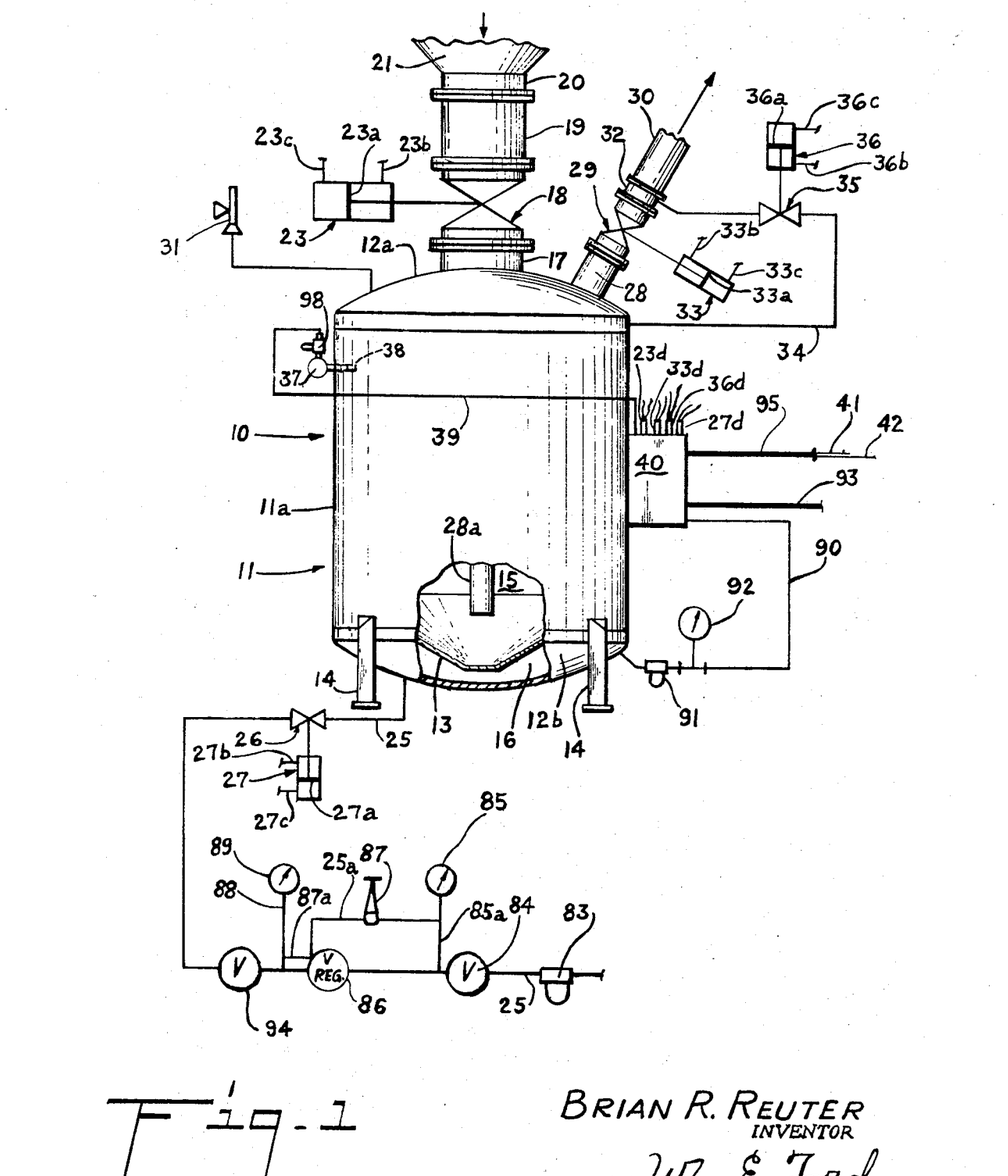
FIG. 1 is an elevational view, partially diagrammatic, showing the parent form of the invention.

Referring now to the drawings in which like reference numerals are applied to like elements in the various views, a material container, housing, pump or activator 10 is shown in FIG. 1 comprised of a shell 11 including a cylindrical main body 11a with upper end closed by a top comprised of a spherical segment or dome 12a and a bottom comprised of a spherical segment or lower closure 12b, the container being constructed after the general manner of conventional pressure vessels, and designed with safety factors, to withstand the highest pressures that may be developed therein.

The pressure vessel or container 10 is supported on legs 14 which upstand from a conventional base or grout, not shown. A gas permeable membrane or diaphragm 13 separates the container into an upper, or material plenum 15, and a lower, or gas plenum 16.

The dome 12a has an inlet flange or neck 16 connected centrally into the top thereof with an inlet gate valve or fill valve 18 being mounted thereon. A flexible nipple 19 is shown connecting the fill valve 18 with a discharge flange 20 from a hopper 21, the nipple being shown as a flexible member for carrying out an optional function, to be hereinbelow described.

A valve operator 23 is shown diagrammatically, as disposed to open and close the gate valve 18, a piston 23a being shown provided in the valve operator 23, with instrument air admissible under the piston 23a through a conduit 23b to open the fill valve, and with instrument air being admissible through a conduit 23c above the piston 23a to close the fill valve. Obviously, the conduits 23b and 23c must be in a closed compressed air circuit with a pressurized reservoir, or otherwise selectively supplied with compressed air, to carry out their respective functions.

A compressed gas conduit 25 is shown connected into the lower end closure 12b of the shell or pressure vessel 11 and such compressed gas inlet line 25 has a gas inlet valve 26 therein, which is shown connected to be opened and closed by a valve operator 27, constructed and equipped in correspondence with the valve operator 23.

Also, a discharge outlet pipe 28 extends downwardly through the dome 12a to terminate in a pick-up end 28a disposed slightly above the gas permeable or air permeable membrane 13. A valve 29 is shown connecting this discharge outlet pipe 28 with a discharge conduit 30 disclosed as having a flexible nipple 31 therein downstream from a purge line connection nipple 32, the flexible nipple 31 being for an alternative purpose to be hereinbelow described.

The discharge valve 29 is shown operated by a valve operator 33, which is indicated as being constructed, and as having connections thereto, in correspondence with the fill valve operator 23.

A purge line 34 extends between the purge line connection nipple 32 and the material plenum or chamber 15 and has a purge valve 35 therein to control its opening and closing, a valve operator 36 being shown connected to the purge valve 35 for this purpose, such valve operator 36 being constructed, and having connections in correspondence with the fill valve operator 23. However, it may be pointed out, in this regard, that the purge valve 35 should be a normally open valve, whereas, the fill valve 18, gas inlet valve 26, and discharge valve 29 are normally closed valves.

Figures 13, 14:
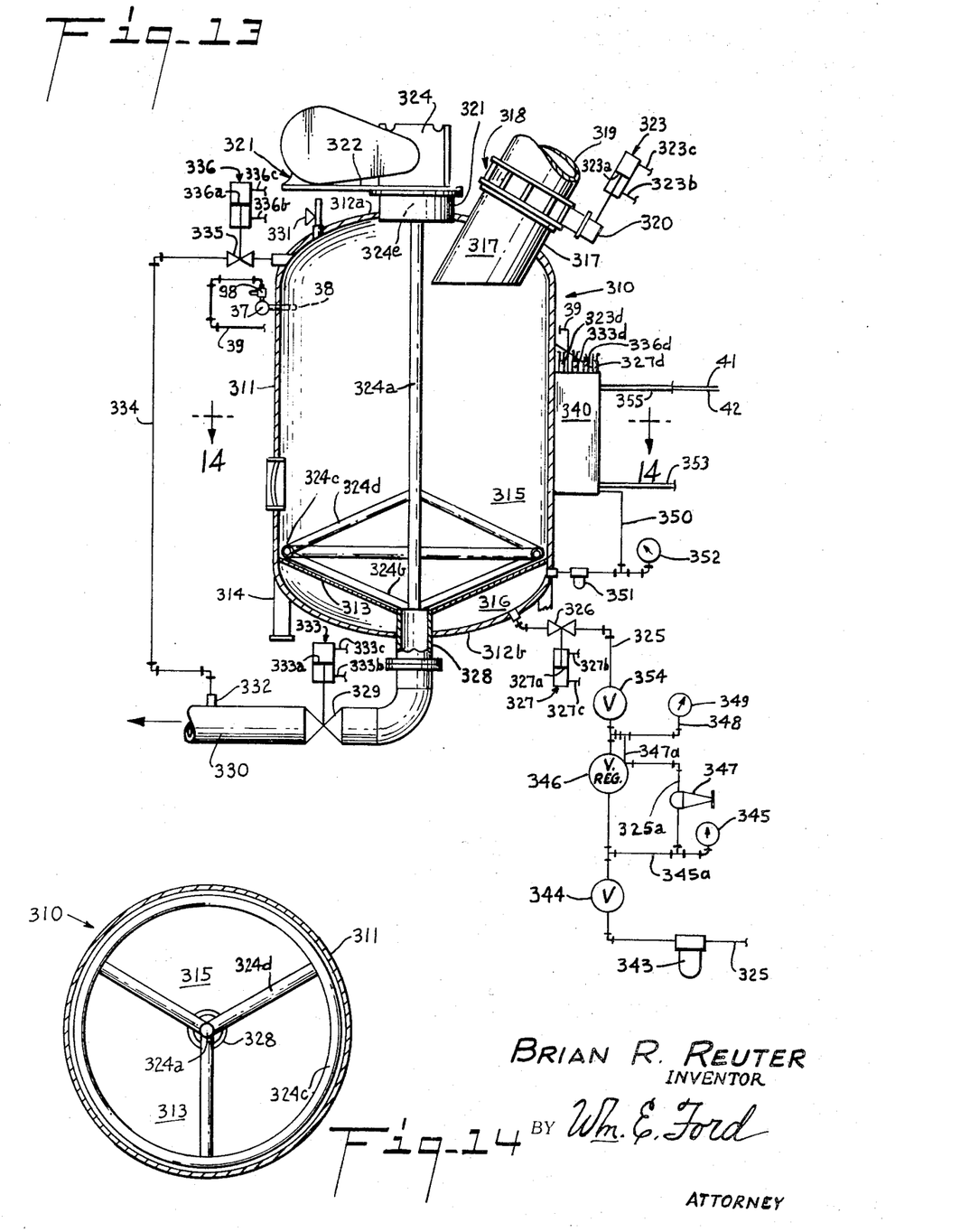
FIG. 13 is a sectional elevational view, partially diagrammatic, of the preferred form of the inventions set forth in this application; the view showing details and proportions of agitator and its drive, and direction of material discharge and delivery.
FIG. 14 is a sectional plan view, taken along line 14—14 of FIG. 13.

A preferred form of the invention is shown in FIGS. 13 and 14 in which a pressure vessel or pump 310 includes a shell 311 having a spherical segment dome 312a and a spherical segment bottom 312b supported by legs 314. A gas permeable membrane or diaphragm 313 separates the pump or container 310 into an upper or material plenum 315 and a lower or gas plenum 316.

The dome 312a has a discharge spout or material delivery conduit 317 which is shown extending thereinto at angle from the right, and from a materials hopper, not shown. A butterfly valve housing 318 is shown upon the discharge or delivery conduit 317, and thereabove conduit continues as downspout 319 from a hopper, not shown. A valve operator 323 is shown for operating transmission gearing 320 to turn the butterfly valve 318, on and off, selectively.

A top flange 326 is provided centrally of the dome 312a from which extends a base 322 for a motor 321 which drives a gear reducer 324 which is connected to drive a vertical shaft 324a that extends centrally downwardly in the pressure vessel or pump 310, the shaft 324a being journalled in, and passing downwardly through a substantially flexible seal 326, indicated by dotted lines to be within the flange 321.

The vertical shaft 324a is indicated as being centered at its lower end by connection thereto of three equally, angularly spaced apart agitator blades or pipes 324b which extend upwardly and outwardly at the slope of the diaphragm 313. Below the junction of these three pipes 324b a discharge pipe or nipple 328 extends downwardly through the diaphragm 313 and the vessel bottom 312b.

A valve operator 323 is shown connected to open the fill valve 318 by means of the transmission gearing 320, the piston 323a of the valve operator 323 having the outer end of its piston rod operatively engaged to the transmission gearing as by a rack, not shown, which can rotate a pinion member of the gearing. Instrument air is admitted through conduit 323c above the piston 323a to move the piston 323a to drive the transmission gearing 320 in direction to close the fill (butterfly) valve 318, and thus instrument air is admitted via the conduit 323b under the piston 323a to open the fill valve.

A compressed gas conduit 325 is shown connected to be opened into the lower end closure 312b of the pressure vessel shell 311, with the gas inlet valve 326 in such gas conduit 325 being connected to be opened and closed by a valve operator 327 constructed and equipped in correspondence with the valve operator 323.

From the downdrop pipe or nipple 328, through gas plenum 316 and shell bottom 312b, the discharge conduit 330 turns and extends horizontally with a discharge valve 329 being provided therein which is connected to be opened and closed by a valve operator 333 constructed and equipped in correspondence with the valve operator 323.

Also, a purge conduit 334 extends from a connection fitting 332 into the discharge conduit 330 downstream of the discharge valve 329, and passes upwardly for connection into the shell 311 near the top thereof, a purge valve 335 being provided in the purge conduit 334 to be opened and closed by a valve operator 336 constructed and equipped in correspondence with the valve operator 323.

Noticeably in FIG. 1, in FIG. 13, and in FIG. 4 (to be hereinbelow described) a support body 37 for a vibratory paddle 38, operative on the tuning fork principle, is shown connected into the cylindrical body 11a of the shell 11, the material sensitive paddle 38 being indicated in dotted lines in each of FIG. 1, FIG. 13 and FIG. 4 as extending within the housing 10 near the top thereof, such paddle being operative to actuate the valve operator 23, 323 (FIGS. 1 and 4, FIG. 13) to close the fill valve 18, as will be hereinbelow described.

Figures 2, 3:
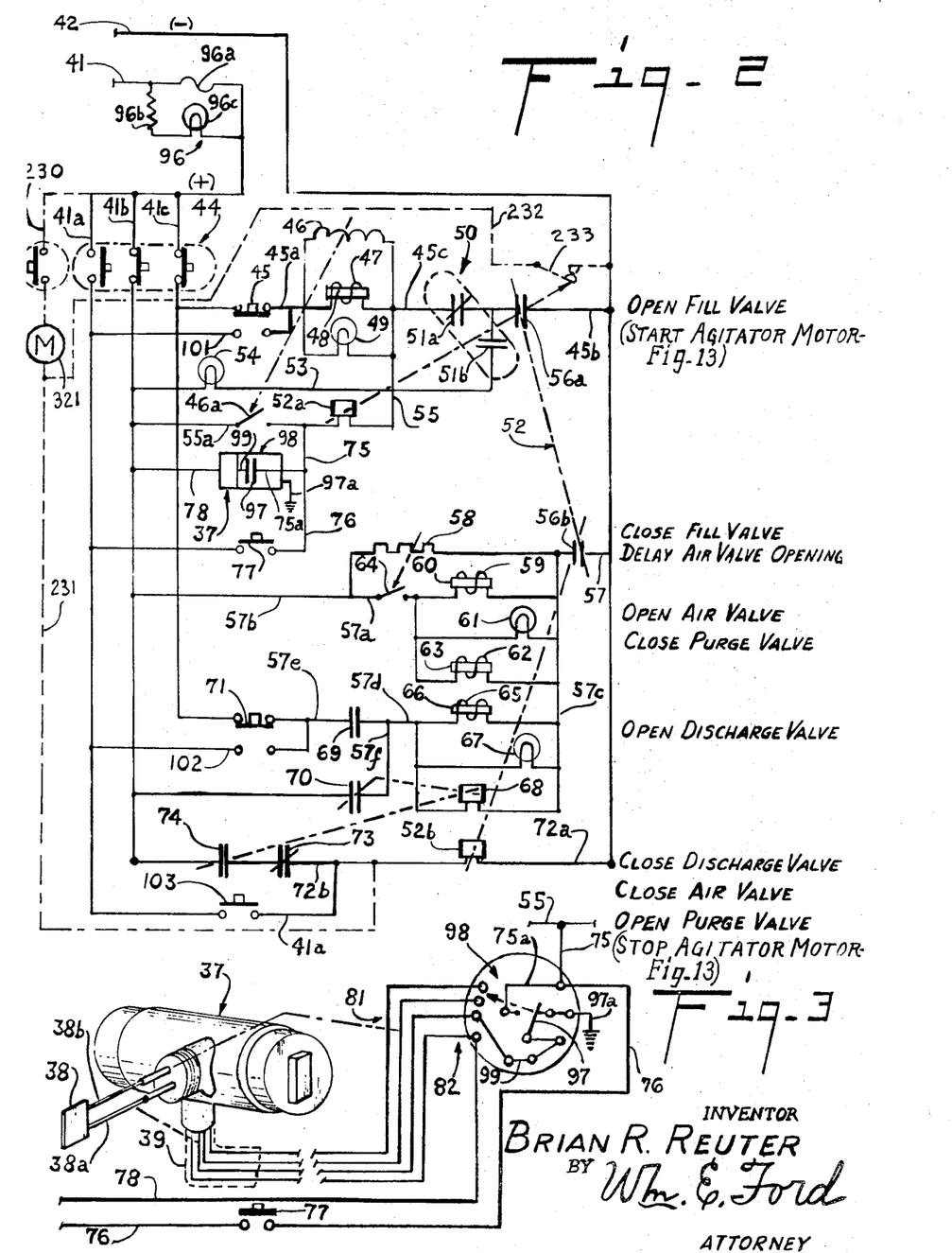
FIG. 2 is an electrical diagram of circuitry and apparatus employed in the operation of the form of the invention shown in FIG. 1; also in FIGS. 13 and 14.
FIG. 3 is an isometric view, partially diagrammatic, of a feature indicated as employable alternatively in the forms of invention shown in FIGS. 1 and 2; and in FIGS. 13 and 14; or as a safeguard in the forms of invention shown in FIGS. 1 and 2, in FIGS. 4–12, inclusive, and in FIGS. 13 and 14, in capacity of a level sensitive switch.

An insulative cord 39, having therein the electrical conduits to the paddle 38, extends from the paddle support body 37 to a control box 40, to be hereinbelow described, and shown mounted on the exterior of the activator shell body 11a. As shown in FIG. 2, a positive line 41 and a negative line 42 extend from a source of electrical power, the positive line 41 having three parallel lines 41a, 41b, and 41c branching therefrom with the line 41a serving when manual control is to be used as will be hereinbelow described with the line 41b serving as a neutral third positive conductor and with the line 41c serving as the positive conductor when automatic control is to be employed. A three-way switch, indicated generally by reference numeral 44, is provided to control the selection of automatic or manual control, as desired, and as shown, the switch 44 indicates that automatic control has been selected, the conductors 41b, 41c thus being closed and the conductor 41a being open.

A conductor 45 extends from the conductor 41, and a pushbutton switch 45a is shown in FIG. 2 as closing circuit in this conductor, the conductor 41 continuing to a junction with three parallel circuits including the circuit of a variable time delay relay 46, the circuit 47 for a solenoid 48 which operates the fill valve operator 23, 323 (FIGS. 1 and 4, FIG. 13), and the circuit of an indicator light 49 which may be designated as a green light for illustrative purposes.

The conductor 45 continues as the conductor 45c and has contacts 51a therein of a double acting pressure actuated switch 50, such contacts 51a being normally closed at atmospheric pressure and opening upon increase of pressure in the gas plenum 16. The conductor 45c continues from the contacts 51a to a junction with a conductor 45b having therein the normally closed relay contacts 56a of a latching relay 52, the conductor 45b terminating at its connection to the negative power line 42.

A parallel circuit 53 extends from the neutral or central positive conductor 41b, to the junction of the conductors 45c, 45b, such parallel circuit also including therein the contacts 51b of the aforesaid pressure actuated switch 50, such contacts 51b being normally open at atmospheric pressure and closing upon increase of pressure in the aforesaid gas plenum 16. The circuit 53 also has therein an indicating light 54, designated as a yellow light for indicating purposes, as will be hereinbelow described.

Another parallel circuit 55 from the positive conductor 41b has the switch 46a therein which is closed by the variable delay relay 46 at the end of its pre-selected cycle, the circuit 55 also having therein the coil 52a of the latching relay 52, and the circuit 55 being continued by the circuit 45c, as aforesaid. The circuit 55, as thus closed, energizes the latching relay coil 52a to open the normally closed relay contacts 56a to break the aforesaid parallel circuits 46, 47, 49, and 55, and upon the solenoid circuit 47 being de-energized, the solenoid 48 retracts and moves the valve operator 23 to close the fill valve 18, both valve operator and fill valve being shown in FIG. 1, also in FIG. 4 and FIG. 13.

The latching relay 52 is of the well known type, which, when its coil 52a is energized, it actuates conventional switching means which opens the normally closed contacts 56a, and pulls closed the normally open contacts 56b in a parallel circuit 57 extending from the negative conductor 42, in manner that the latching relay mechanism latches against any movement except that which may be imparted to the switching means to pull open the normally open contacts 56b, which can only be effectuated by the energization of the latching relay coil 52b, to be hereinbelow described as to operation.

The normally open contacts 56b are disposed in a circuit 57 from the negative power line 42, and which branches into four parallel circuits: 58, including a fixed time delay relay of the thermal delay type; a circuit 59 which includes the coil for operating a solenoid 60 connected to actuate the valve operator 27, 327 (FIGS. 1 and 4, FIG. 13), to open and close the compressed gas inlet valve 26, (326, FIG. 13), a circuit which includes the light 61 therein, which is designated as a blue light, for purposes of illustration; and a circuit 62 including the coil for operating a solenoid 63 connected to actuate the valve operator 36, 326 (FIGS. 1 and 4, FIG. 13), to open and close the purge valve 35 (335, FIG. 13).

A circuit 57a continues from the junction of the circuits 59, 61, and 62, and has a switch 64 therein which is closed by the fixed time relay 58 when its circuit has been closed for its fixed period of time, while a circuit 57b continues from the junction of the circuit 57a and the fixed time delay relay circuit 58, to the aforesaid neutral or positive conductor 41b.

Also, a circuit 57c continues from the junction of the circuits 59, 61, and 62 with the circuit 57, and branches into: a circuit 65 including the coil which operates a solenoid 66 which actuates the valve operator 33, 333, (FIGS. 1 and 4, FIG. 13), to open and close the discharge valve 29 (329, FIG. 13); a circuit including a light 67 therein, which is designated as a red light, for purposes of illustration; and a circuit having a relay 68 therein; a circuit 57d continues from the positive side junction of the circuits 65, 67, and 68, and branches into a circuit 57e having a normally open pressure actuated switch 69 therein, to be hereinbelow described, the positive side connection being completed with the conductor 41c; and into a circuit 57f having a pair of contacts 70 therein operated by the relay 68, and terminating by connection with the neutral or positive conductor 41b. A pushbutton switch 71 is shown in FIG. 2 closing the circuit 41c adjacent its connection to the circuit 57e.

Additionally a circuit 72b, 72a connects the positive or neutral conductor 41c with the negative power line or conductor 42; the circuit 72b having in series therein a pair of contacts 74 (operated by the relay 68 substantially simultaneously with its operation of the contacts 70 on the circuit 57f, and a normally closed pressure sensitive switch 73, as will be hereinbelow described); the circuit 72a having therein the latching relay coil 52b which operates to break circuit closed by the hereinabove described relay contacts 56b.

Figure 4:
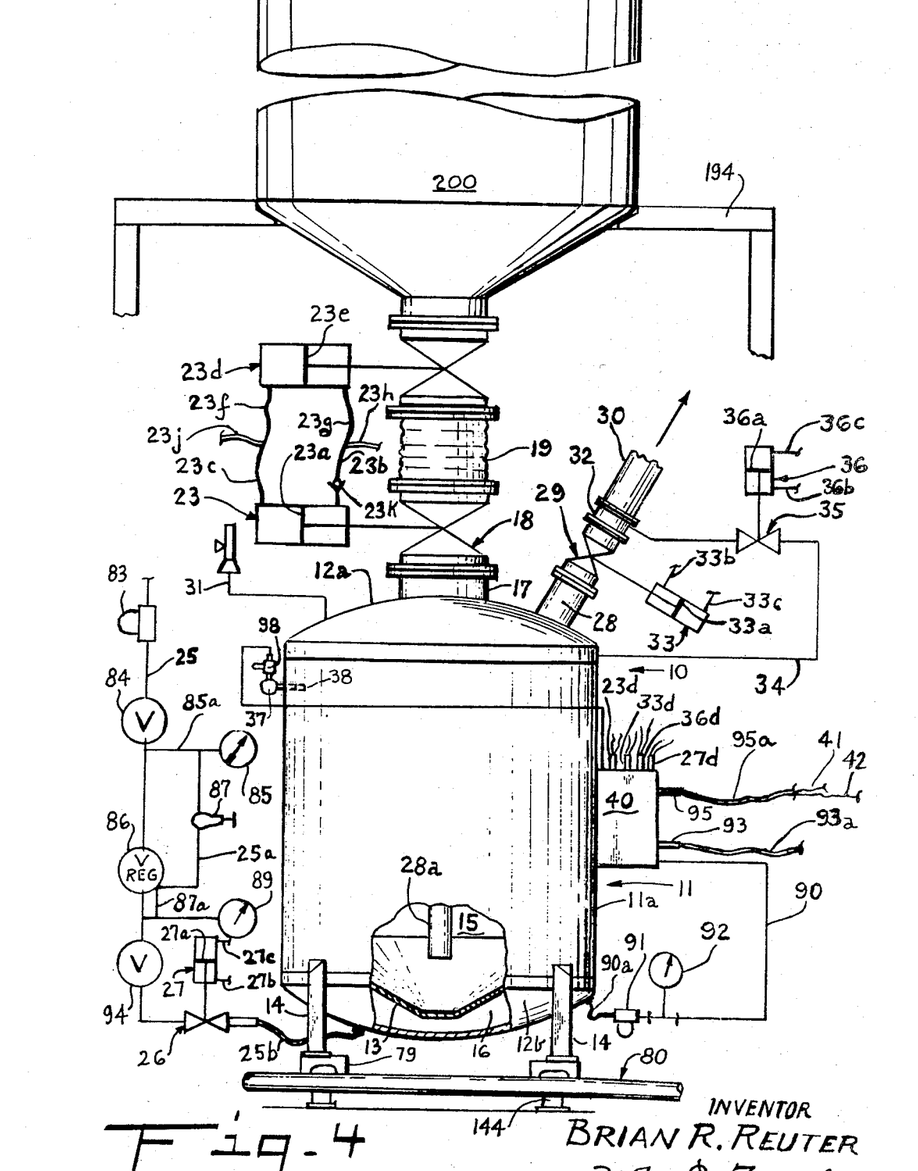
FIG. 4 is an elevational view, partially diagrammatic, showing substantially the invention in FIGS. 1 and 2, but adapted to weigh the material being handled and to respond to weight therein as reflected in terms of pressure to actuate the closing of the fill valves.

As shown in FIGS. 1 and 4, and in FIG. 13, respectively the gas, as compressed air, which activates and transports the material which enters the container, shell, or pressure vessel 11, 311, arrives from its source, as a compressor or pressurized reservoir, and passes through a strainer 83, 343, and a globe valve 84, 344, on its way to being regulated as to the pressure at which it is to be supplied. Thus the gas is first measured by a high pressure gauge 85, 345, in the top of a gauge pipe 85a, 345a which upstands from the main gas line 25, 325, through which the strained gas passes on downstream. A smaller sized by-pass line 25a, 325a, extends between the gauge pipe 85a, 345a, and the aforesaid pressure regulating valve 86, 346, in the main conduit 25, 325, and has a pilot regulating valve or regulator 87, 347 therein, thus to permit a finer and more responsive control of the pressurized gas on its way to the pressure vessel 11, 311. A by-pass line 87a, 347a, conveys the reduced pressure gas from the pilot regulator 87, 347, and connects with an upstanding gauge pipe 88, 348, above the main conduit 25, 325, a low pressure gauge 89, 349, being mounted on top of the gauge pipe 88, 348, to indicate the lowered pressure of the gas.

A conduit 90, 350, extends from the lower closure 12b, 312b, to conduct pressurized gas from the gas plenum 16, 316, to the control box 40, 340, there to bear upon and cause actuation of the pressure sensitive switch 50, operative as hereinabove described, and to bear upon and cause actuation of pressure sensitive switches 69 and 73, to be further described hereinbelow as to operation.

Such switch actuating gas, from within the pressure vessel 11, 311, enters the conduit 90, 350, and passes through a strainer 91, 351, therein, and on to the panel box 40, 340, a gauge 92, 352, being provided to indicate the pressure of the actuating gas as it passes downstream of the strainer 91, 351, on its way to the panel box pressure sensitive switches, as aforesaid. The instrument air required by the pressure sensitive switches, as contradistinguished from the actuating air or gas, and any other air or gas required to actuate any of the apparatus, as that shown in FIG. 2, or as that required to operate the valve operators shown in FIG. 1 and 4, and FIG. 13, may be brought to the panel box 40, 340, through a conduit 93, 353, for selective distribution. Also, the power conductors 41, 42, from a source of electrical power, as a 60 cycle, 115 A.C. voltage source, may be brought to the panel box 40 through an insulated conductor cord 95, 395.

A conventional fuse 96 is provided in the positive power line 41, indicated as comprising the conventional fuse strip 96a, and in a parallel circuit therewith, the conventional resistance 96b and indicating light 96c.

Also, as hereinabove referred to with relation to FIGS. 1 and 4, and FIG. 13, a material sensitive, frequency change, actuated, control assembly 37 is provided to insure the closing of the fill valve 18 in case the variable time delay relay 46 may not function to close the time-out switch 46a at the end of the time cycle period selected, as indicated diagrammatically in FIG. 2, and as shown partially diagrammatically and in greater detail in FIG. 3.

The "fail-safe" circuit 75 is shown extending from a point on the conductor 55 between the time-out switch 46a and the latching relay coil 52a, and is continued to a solids state relay housing 98, there to be connected to the junction between a conduit 75a to the normally open side of a relay switch 97, and a circuit 76 which extends to the positive conductor power line 41a, the circuit 76 having the pushbutton switch 77 therein, to be hereinbelow described. Normally, the relay switch 97 closes contact between a grounded conductor 97a (and thus the negative power line side 42), and a conductor means 99 between the relay switch 97 and the negative terminal of a coil 82 in the control housing 37.

The coil 82, within the housing 37, is indicated externally thereof, by its connections 82a, 82b which terminate within the plug 98. Within the housing 37 the coil 81 energizes a plunger or armature, not shown, in manner that it normally vibrates 120 cycles per second to impart vibration at this frequency to the lower tuning fork tine 38a which is connected to the paddle or vibrator 38. Thus normally the tine 38b also vibrates with the paddle 38 at 120 cycles per second. The vibrations of the tine 38b are imparted to an armature, not shown, which normally actuates a second coil 81, at an imparted voltage, at 60 cycles per second frequency.

An induction coil, not shown, is imposed across the terminals of the coil 81 within the plug so disposed with relation to the switch 97 that this switch may be shifted when the differential between the line voltage and the imparted voltage achieves a certain value, as is the case when material entering the container or pump 10, 310, extends at such an angle of repose to interfere with, reduce, or stop the vibrations of the paddle 38.

When the aforesaid induction coil across the terminals of the coil 81 thus shifts the switch 97 to close circuit from the neutral or positive side conductor 41b, by way of the conductor 78, the coil 82, and the conductor 99, through the switch 97, as thus shifted, and by way of the conductors 75a, 85, 55 (including the latching relay coil 52a), and on through the conductor 45c, the closed switch contacts 51a, and the circuit 45b (including the latching relay closed contacts 56a), to the negative power line 42. The energization of the latching relay coil 52a in the circuit 55 results in the latching relay breaking the circuit 45b by shifting open the contacts 56a, whereby the solenoid winding 47 is de-energized to actuate the solenoid 48 to operate the valve operator 23 to close the fill valve 18.

Obviously the quicker the "fail-safe" switch 97 is operated after a failure of the variable time delay relay 46 to close the time-out switch 46a, the less the material from the hopper 21 can over fill the container 10, and the closer the delivered batches of material may be controlled to deliver a desired lesser volume per batch.

Also, it is obvious that the variable time delay relay 46 may be omitted entirely, together with its time-out switch 46a, and in this case the frequency control device 37 alone can be relied upon to actuate the valve operator 23, 323, to close the fill valve 18, 318.

On occasion it may be desirable to operate the filling and evacuation of a vessel 10, 310, by manual control of the sequence of steps, rather than automatically, as hereinabove described. For such occasion, it may be considered that the variable time delay relay 46 and its timing out switch 46a are immobilized. Then a circuit 101 is provided, parallel with the circuit 45, to extend from the positive conductor 41a and to connect with the circuit 45 between the pushbutton 45a and the circuit junction 46, 47, 49. Also, in this case there also serves the aforesaid circuit 76 from the circuit 41a to the junction of the circuits 75, 75a, and having the pushbutton 77 therein; also the circuit 102, parallel with the circuit 57e and connected thereinto between the pushbutton 71 and the normally open pressure sensitive switch 69; also the positive power circuit 41a is extended to connect with the junction of the circuits 72a, 72b, and to have the pushbutton 103 therein.

Thus, with the three-way switch controlling the parallel conductor lines 41a, 41b, and 41c turned from the position shown in FIG. 2, in manner that the conductors 41a, 41b are closed, the conductor 41c thus being left open. Beginning with the container 10 empty and at atmospheric pressure, the pushbutton 45a may be pushed downwardly and held to close the circuit 101. The circuit 47 is thus energized so that the solenoid 48 actuates the valve operator 23 to open the fill valve 18. Then, the pushbutton 45a may be released from closing the circuit 101, thus breaking circuit through the solenoid coil 47 so that the solenoid 48 actuates the valve operator 23 to close the fill valve 18.

With a batch of material delivered into the container 10 in amount determined by the length of time the pushbutton 45a has closed the circuit 101, activation of the material may be started, after the pushbutton 45a has been released, by manipulating the pushbutton 77 to close the circuit 76. Circuit is thus closed through the circuit 75, the circuit 55 including the latching relay coil 52a, and to the negative power line side 42, by way of circuit 45c, closed contacts 51a of the pressure sensitive switch 50, and the circuit 45b, including the latching relay closed contacts 56a therein. This energizes the latching relay coil 52a to operate the latching relay 52 to break the contacts 56a and close the contacts 56b.

Circuit is thus closed to the fixed time delay relay 58, which actuates the "time out" switch 64 to close the solenoid coil circuit 59, thus to actuate the valve operator 27 to open the compressed air valve 26; also the solenoid coil circuit 62 is closed whereby the solenoid 66 actuates the valve operator 36 to close the purge valve 36.

Then, the operator of the apparatus may observe the gauge 92, 392, and when the pressure indicates that the vessel is ready to discharge, or when the operator appreciates that a proper time interval after the opening of the gas inlet or compressed air valve 26 has taken place, the pushbutton 71 may be pushed to close the circuit 102, the normally open, pressure sensitive switch 69 being closed by the pressure that has built up in the vessel.

Thus, as aforesaid, the armature 65 may move to set in operation the opening of the discharge valve 29, while circuit is closed to operate the second relay 68 so that it closes the circuit 57f, and closes the contacts 74 to partially close the circuit 72b. Discharge may thus continue as long as the pushbutton 71 is held closing circuit 102, or even if the operator may now release the pushbutton 71, since in this case the circuit continues completed through the contacts 70 in the circuit 57f, even after the pressure has fallen enough to cause the pressure sensitive switch 69 to open.

Thus to purge a pump 10, 310, after the pushbutton 71 has been released, or thereafter, or at any time, with the three-way switch 44 turned to manual operation (41a, 41b, closed), it is only necessary to push the pushbutton 103 to close circuit with the circuit 72a to energize the latching relay coil 52b, which, when energized, operates, as aforesaid, to close the circuit 45b and to break the circuit 57, whereby the purge valve 35 is opened and the compressed air valve 26 and discharge valve 29 are closed. Then, as the purge pressure diminishes the normally closed, pressure sensitive switch 73 opens, and as the pressure falls further to substantially atmospheric pressure, the contacts 51a of the pressure sensitive switch 50 close, and the pushbutton 45a may again be pushed to close the circuit 101 to admit material into the container 10, 310.

In FIGS. 1 and 4, and in FIG. 13 respective conduits 23b, 27b, 33b, and 36b connect (323b, 327b, 333b, 336b), into the respective fill, compressed gas, materials delivery and purge valve operator cylinders 23, 27, 33 and 36, under (323, 327, 333 and 336), the respective piston heads 23a, 27a, 33a, and 36a (323a, 327a, 333a, and 336a), respective conduits 23c, 27c, 33c, and 36c (323c, 327c, 333c and 336c), connect into such cylinders above the respective piston heads therein. Thus, conductor cords or sleeves 23d, 27d, 33d, and 36d (323d, 327d, 333d, and 336d), for the respective conduits for the respective valve operator cylinders aforesaid, are provided to extend from the control or panel box 40 (340), where conventional instrument air, as from the instrument air conduit 93 (393), may pass through respective conventional solenoid actuated valves, not shown, as operated by the aforesaid solenoids 48, 60, 66, and 63, to admit the operative air, gas or fluid, selectively into the conduits 23b or 23c (323b or 323c); into the conduits 27b or 27c (327b or 327c); into the conduits 33b or 33c (333b or 333c); and into the conduits 36b or 36c (336b or 336c); selectively to open or close the aforesaid fill valve 18 (318), compressed gas valve 26 (326), materials delivery valve 29 (329), and purge valve 35 (335).

As shown in FIG. 2, a light 49 is in circuit parallel with the solenoid circuit 47 and the variable time delay relay circuit 46, and thus the light 49 is on when the fill valve 18 is open; also a light 61 is in a circuit parallel with the solenoid circuit 59 which actuates the valve 26 which admits the material activating compressed gas, and with the solenoid circuit 62 which closes the purge valve; and also a light 67 is in a circuit parallel with the solenoid circuit 65 which actuates the opening of the materials delivery valve 29. Additionally, a light 54 is shown in a circuit 53 which is complete when the latching relay 52 is actuated to close the contacts 56a while the pressure within the container is still high enough to maintain closed the contacts 51b of the pressure sensitive switch 50. Thus, this occurs after the purge valve 35 has been re-opened by opening of the latching relay contacts 56b, to permit the purging of the container by the residual pressure therein until such pressure drops to substantially atmospheric so that the pressure sensitive switch 50 is actuated to open the contacts 51b and close the contacts 51a, thereby breaking the circuit 53 which contains the light 54 therein.

The lights 49, 61, 67, and 54 may have selectively differently colored bulbs, as, respectively, green, blue, red, and amber, thus to indicate, respectively, that filling, activating, discharging and purging are taking place.

The respective valve operators 23, 27, 33, and 36 (323, 327, 333, and 336), may be used to operate the respective fill valve 18 (318), compressed gas delivery valve 26 (326), material delivery valve 29 (329), and purge valve 35 (335), but it is often not necessary, in the case of light duty installations, and/or in the case of the valves 26, 29, and 35 (326, 329, and 335), that special valve operators may be required for their operation. In such cases the solenoids 60, 66, and 63 may thus be connected directly to the respective valves 26, 29, and 35 (326, 329, and 335), to effectuate their operation.

As to the gas permeable membrane 13 (313), this may be variously constituted to carry out various requirements. The membrane 13 (313), may be a flexible diaphragm as of a heavily woven cloth, as of cotton, or of a synthetic or plastic cloth as of nylon or Dacron. Also instead of being flexible the membrane may be rigid or substantially rigid. Thus it may be of woven metal, or of non-corrosive woven metal, such as stainless steel, to combat corrosion. Also it may be of a porous ceramic, also to avoid corrosion, as well as to provide a stable membrane. An additional advantage in there being selectivity in the synthesis of the membrane resides in the fact that a wider range of materials can be handled to pass through the membrane under the most advantageous conditions where this selectivity is available.

Also, as to the "fail-safe" feature of the vibrating paddle 38, the sensitivity of this feature is such that it can be regulated to operate almost instantaneously as a container first starts to overfill, so that the relay 52a is energized to operate the latching relay 52 immediately the variable time delay relay 46 fails to function.

Additionally, as set forth hereinabove, the vibratory paddle 38 may be used instead of the variable time delay relay 46, as the primary functional element to actuate the closure of the fill valve 18. In such case the sensitivity of the paddle 38 to adjustment, can determine the promptness of sensitivity to material to close the relay switch 97.

Figures 5, 6, 7, 8:
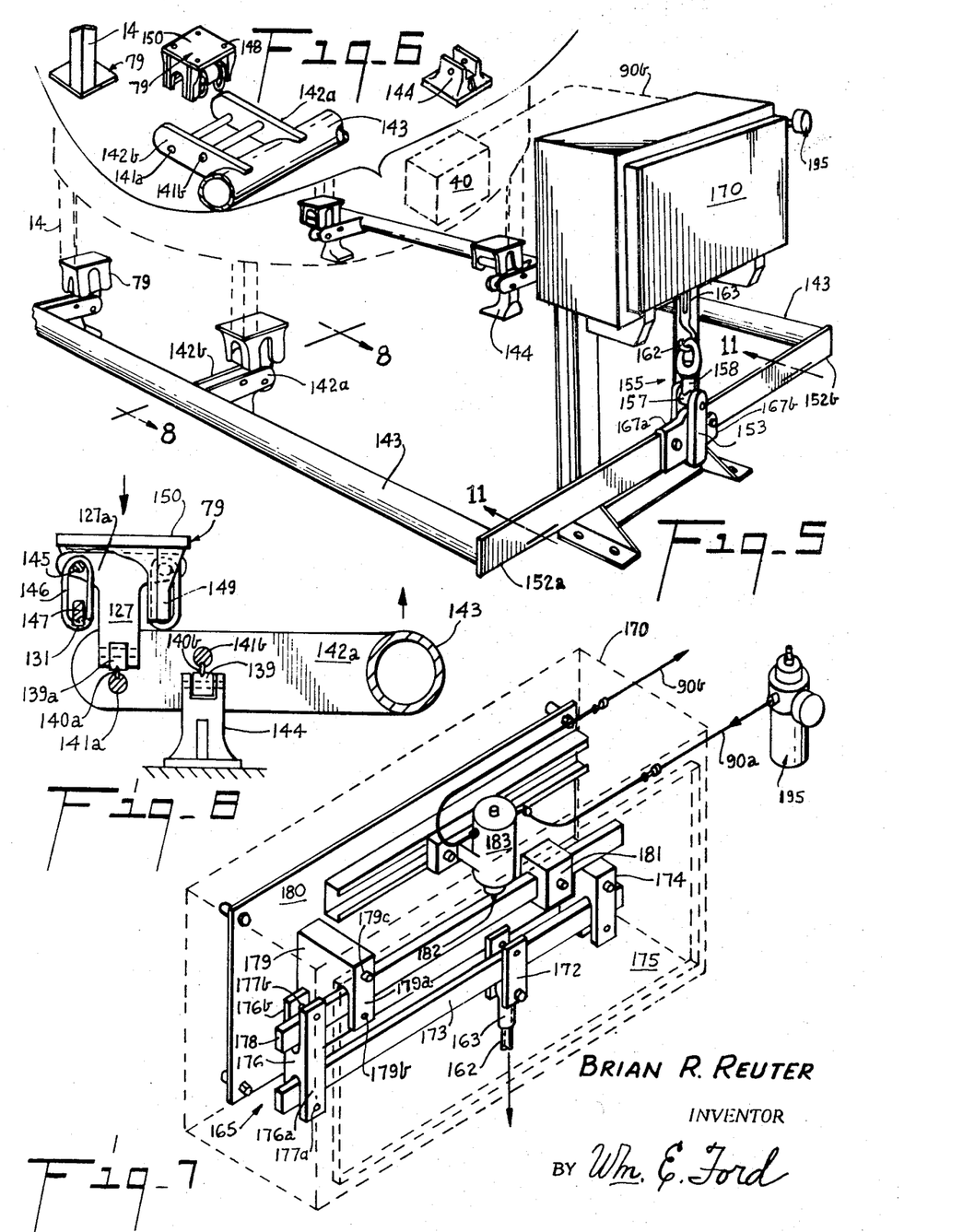
FIG. 5 is an isometric view of apparatus on which a pressure vessel pump is mounted when the fill valve is to be closed responsive to weight indication.
FIG. 6 comprises development views in isometric, showing details of girder chair construction on which the legs of the pressure vessel pump, shown in FIG. 5, are mounted.
FIG. 7 is an isometric view of beam scale mechanism and associated apparatus for imparting weight responsive signals, the housing or cover therefor shown in FIG. 5, having been removed.
FIG. 8 is a transverse sectional elevation through a girder chair, as indicated taken along line 8—8 of FIG. 3.

A popular embodiment of the invention is shown in FIGS. 4–12, in which the pump 10, shown in FIG. 1, is mounted on a floor stand scale hopper, FIGS. 4 and 5, and adapted to transfer a batch of material when the batch weight entering the pump attains a predetermined weight. The hopper scale 80 is thus adapted to reflect weight in terms of pressure and thus the time delay relay 46 shown in FIG. 2 is replaced in the circuitry shown in FIG. 9 by the symbol PS indicating that the switch 46a is closed responsive to pressure.

The floor stand hopper scale 80 on which the pump 10 is shown mounted in FIGS. 4 and 5, provides for each leg 14 of the pump 10, a girder chair 79. The support block 127 of each girder chair 79 has a pivot block 139a pin-connected to extend therebelow, centrally thereof, and an inverted V-shaped groove in the lower surface of the pivot block 139a is provided to seat upon the beveled edge of a pivot bar 140a (FIG. 8) which extends upwardly from a cross-connecting rod 141a between two longitudinally spaced apart, transversely inwardly extending lugs 142a, 142b the outer ends of the lugs being rigidly connected to a respective main lever pipe 143. The hopper scale 80 thus provides a pair of these lugs 142a, 142b for each girder chair 79 and corner stand 144, to be hereinbelow described.

Each corner stand 144 supports the weight transferred thereto from a pump leg 14, as the corner stands 144 in turn seat upon the floor or grout. For this reason, each corner stand 144 is slotted in direction longitudinally of the pump or machine 10 to receive a pivot block 139b pin-connected thereinto. Each pivot block 139b, as thus mounted, has a V-shaped groove extending longitudinally, centrally thereof, to provide a seat for the bevel edge or blade edge of a pivot bar 140b which is carried by a cross-connecting rod 141b which extends between the two lugs 142a, 142b.

It may be seen that each corner stand 144 provides a fulcrum which extends longitudinally of the hopper scale mounted pump 10, the lug units 142a, 142b which extend parallel to each other and transversely of the machine being mounted on such fulcrums, with the girder chairs 79 which transmit the load of the respective pump legs 14 thereabove being disposed inwardly of the fulcrums with relation to the longitudinal axis of the machine. Thus the main lever pipes 143, on the opposite or outer sides of the fulcrums from the impressed loads, will tend to be lifted upwardly but for restraining or counter balancing forces.

Referring again to the girder chair construction, each support block 127 is shaped substantially as a T, with a hole bored through each end of the cross-arm 127a, to receive a pin 145 therethrough. A chain link 146 is fitted over the pin 145 just outwardly of the cross-arm 127a, a washer just outwardly of each chain link 46, and a retention pin is passed through the outer ends of each pin 145 to hold the washers and chain links 146 assembled to the support block 127.

For reasons of clarity the washers and retention pins are not shown in FIGS. 5, 6, and 8. A connection bar 147 is extended through the chain links 146 on each pin 145 and connected, as by machine screws, not shown, into the legs 149 of each girder chair 79. Also the seat plate 150 of the girder chair 79 is assembled by machine screws 148, FIG. 6, to the legs 149 in spaced relation above the support block 127. The retention pins on ends of the pins 145 are disposed to leave some play therealong for the washers and chain links 146. Also, the connection bars 147 may have location lugs 131 (FIG. 8), on their underside on either side of the respective chain links 146, and slightly spaced therefrom. Thus, when the legs 14 of a vessel 10 seat upon the girder chairs 79 it may be said that the girder chairs 79 may "float" with relation to the lug units 142a, 142b on whose cross-connecting rod pivot bars 140a they are mounted, thus to pass along the load imposed by the vessel 10 to the floor stand hopper scale 80 in a balanced manner.

When the weight of the vessel 10 is balanced upon the four girder chairs 79 with the corner stands 144 providing what could be termed fulcrums, but for balance, there would be the greatest tendency to lift the main lever pipes 143 outwardly of the corner stand fulcrums 144. On the other hand, the main lever pipes 143 extend forwardly of the girder chairs and have the outer ends of respective transverse beam plates 152a, 152b, connected across the front ends thereof. The beam plates 152a, 152b are connected centrally across the front of the beam scale 80 by nose-irons, to be hereinbelow described, which are carried by a bracket shackle assembly 155, also to be hereinbelow described.

Figures 9, 10, 11, 12:
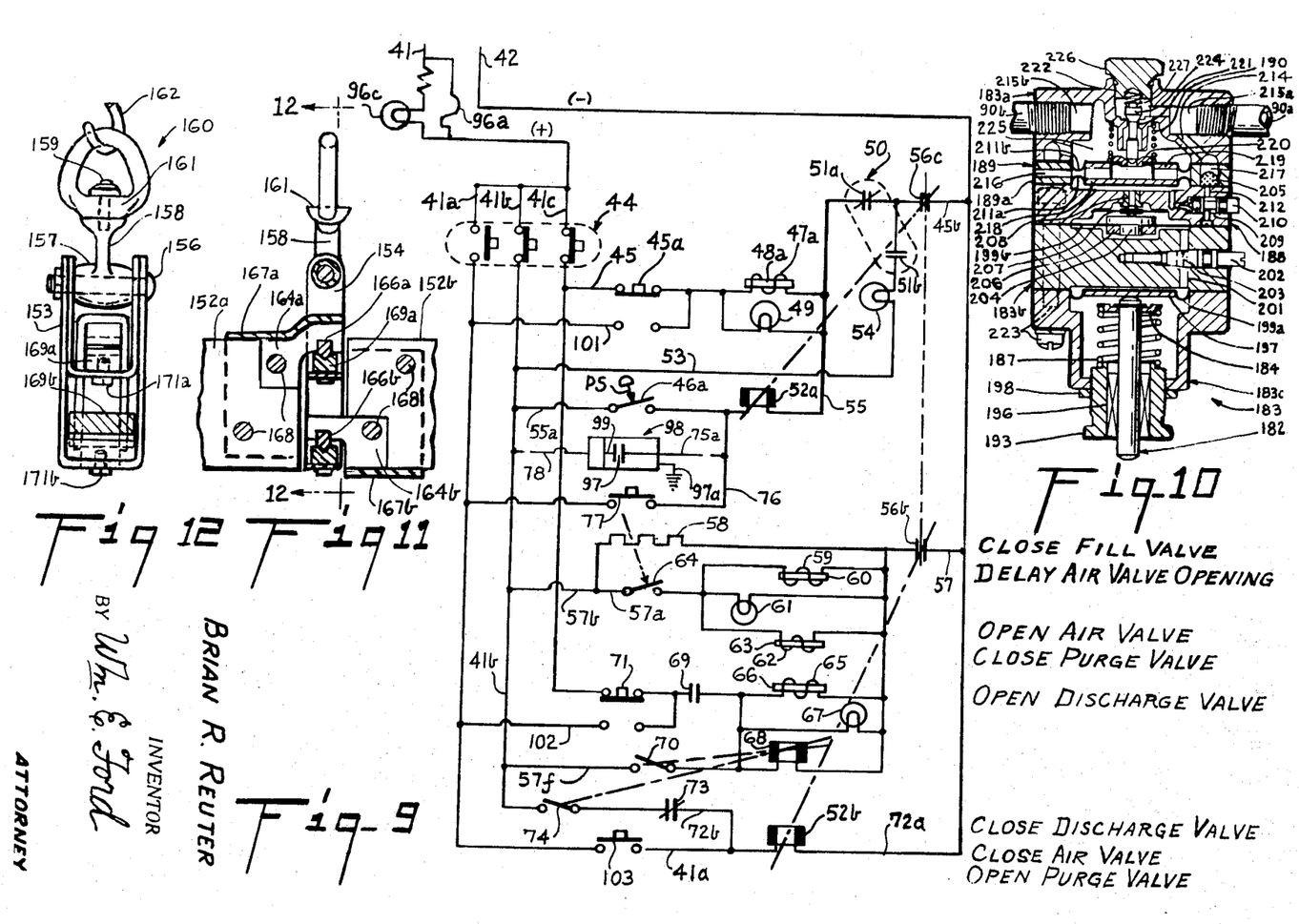
FIG. 9 is an electrical diagram of the apparatus and circuitry shown in FIG. 5.
FIG. 10 is a sectional elevational view, partially diagrammatic, of the proportionate force transmitter for reflecting weight in terms of pressure, as shown exteriorly in isometric view in FIG. 7.
FIG. 11 is a sectional elevational view showing details of shackle and nose-on beam connections, as taken along line 11—11 of FIG. 5, and thus looking rearwardly.
FIG. 12 is a sectional elevational view taken along line 12—12 of FIG. 11 looking to the left.

The bracket shackle assembly 155, as shown in FIGS. 11 and 12, comprises an outer U-shaped bracket 153 and an inner U-shaped bracket 154, with the upper ends of both brackets receiving the outer ends of a swivel pin 156 therethrough, the pin 156 also passing through the body 157 of a swivel assembly 160, as the swivel body 157 between the upper arms of the inner U-shaped bracket 153.

The shackle body 157 includes an upstanding member 158 into which is connected a connection bolt 159 which passes downwardly through the base 161 of a swivel link 160. The S-hook 162 which extends downwardly from the draft shackle 172 of the beam scale 165, as disposed in the beam box 170, is urged downwardly by the weight of the hopper scale 80, which transmits the weight of the vessel 10 to the beam scale 165.

This transmission of load or force components may be understood by a further consideration of FIGS. 11 and 12, as orientated by reference to FIG. 5. The inner end of the beam plate 152a is notched upwardly to receive an upper nose iron holder 164a, which carries a specially hardened nose-iron 166a therein, having a downwardly disposed bevel edge. An upper clamp plate 167a fits downwardly over the nose iron holder 164a, and around the inner end of the beam plate 152a, and bolts or screws 168 connect these members as the bolts extend from one side of the clamp plate 167a to the other side thereof.

Also, the inner end of beam plate 152b is notched downwardly to receive a lower nose iron holder 164b, which carries a specially hardened nose-iron 166b therein, having a downwardly disposed bevel edge. A lower clamp plate 167b fits upwardly over the nose iron holder 164b, and around the end of the beam plate 152b, and bolts or screws 168 connect these members as the bolts extend from one side of the clamp plate 167b to the other side thereof.

The upper, inner U-shaped bracket 154 mounts an upper swivel block 169a thereon, with a bolt 171a passed upwardly through the foot of the bracket into the swivel block providing a vertical pivot axis of swing, as the head of the bolt 171a below the bracket 154 holds the swivel block 169a in assembly. The upper nose-iron 166a fits into a beveled groove in the upper face of the swivel block 169a to complete the assembly of right transverse beam plate 152a and bracket shackle assembly 155. Also, the lower or outer U-shaped bracket 153 mounts a lower swivel block 169b thereon, also with a bolt 171b passed upwardly through the foot of the bracket into the swivel block providing a vertical pivot axis of swing, as the head of the bolt 171b below the bracket 153 holds the swivel block 169b in assembly. The lower nose-iron 166b fits into a beveled groove in the upper face of the swivel block 169b to complete the assembly of left transverse beam plate 152b and bracket shackle assembly 155.

As thus assembled the combination of knife-edge connections and swivel connections of the complementary transverse beam plates or bars 152a, 152b and bracket shackle assembly 155, is such to balance out any irregularities and keep the downward pull on the S-hook 162 substantially in proportion to the weight of the material in the vessel with the weight balanced out. With reference to FIG. 7, the balance of forces and construction can be considered on the premise that the weight on the draft shackle 172 is such, with tare weight adjusted, as to bear a direct proportion to the effective weight of material in the vessel 10 at any instant.

The shank 163 of the draft shackle 172, shown in FIG. 7, from which the S-hook 162, shown in FIG. 12, extends downwardly, is mounted upon a primary lever 173 within the beam box 170, an end of the primary lever 173 extending into an inverted yoke or bearing bracket 174 upon the floor or base 175 of the beam box. At its opposite end the primary lever 173 extends slidably into a double yoke member 176 with a pin 177a through the lower, inverted yoke portion 176a supporting the primary lever therein. The upper yoke portion 176b of the double yoke member 176 receives an end of a secondary lever 178 therein, as retained by a pin 177b thereabove, and a bracket member 170 providing an inverted yoke 179a receives the secondary lever 178 therein in manner to provide a second fulcrum, the bracket member 179 being rigidly connected to an upstanding backing plate 180, as by a machine bolt 179c, the bracket member 179 being affixed to the beam box floor 175. Also, a retainer pin 179b is shown passed through the bracket member 179 below the secondary lever 178.

A tare weight 181 is disposed upon the right or free end of the secondary lever 178 to balance out the tare weight of the vessel 10, as may be accomplished in conventional manner. Now, considering motion, as the weight (equivalent to material weight in vessel) acts downwardly on the draft shackle 172, the left end of the primary lever 173 moves downwardly, and the left end of the secondary lever 178, connected to the same double yoke member 176, also moves downwardly, whereby the part of the secondary lever 178 to the right of the fulcrum supplied by the inverted yoke 179a, moves upwardly. This results in an upwardly urging force being exerted on a plunger 182 in the lower end of a proportionate force transmitter 183, as will be hereinbelow described.

The proportionate force transmitter 183 has the mission of receiving filter instrument air at some predetermined pressure, as 30 p.s.i., via the conduit 90a from a filter regulator 195. Then, by proper pressure reduction adjustment and calibration, the force applied upwardly through the push rod 182 results in the air leaving the proportionate force transmitter 183 at pressure of say 3 p.s.i. as filling begins, up to say 12 p.s.i., when filling has been completed, to set in motion the closing of the fill valve 23 (FIGS. 1 and 4).

The proportionate force transmitter 183 comprises a body including a pilot housing 183a, a diaphragm assembly or exhaust ring 189, a pilot ring 188, a damper housing 183b, and a push rod housing 183c. A bushing 193 is threaded through a locknut 198 and into the push rod housing 183c, centrally thereof, with a ball bushing 196, within the bushing 193, comprising the element which actually establishes the journal for the push rod 182.

A spring 187 receives a spring seat 184 thereon and a retaining ring in a groove near the head of the push rod 182 seats upon the spring seat 184, as the spring 187 urges the head of the push rod 182 upwardly against the under sides of a diaphragm support disc or round plate 197 under a lower damper diaphragm 199a which extends across space between interior of push rod housing 183c and damper housing 183b, and outwardly between the aforesaid damper and push rod housings 183b, 183c.

An upper damper diaphragm 199b between pilot ring 188 and damper housing 183b extends across space therebelow in the damper housing 183b which connects by means of a vertical passage 201 with the space therebelow above the lower damper diaphragm 199a.

A restriction screw 202, having a transverse hole 203 therein, extends transversely into the damper assembly 183b and is adjustably threadable thereinto thus to adjust the amount of opening or passage space between the air space above and the air space below the adjustment screw 202. Thus the action, of upward thrust of the push rod 182, upon the air or compressed gas within the damper housing 183b, may be adjustably dampened, as the filling of the pressure vessel on a weight indicator results in a constantly increasing and normally fast acting force urging upwardly on the push rod 182.

Centrally of the upper damper diaphragm 199b, a pin 204, with round head upwardly, extends downwardly therethrough to be retained by a ring 206, as one that may be press-fitted around the pin 204 with upper surface of ring glued to the under side of the diaphragm 199b. The pin head or flange is disposed below a leaf spring 207 mounted within space within the pilot ring or leaf spring housing 188, a bushed bore 208 extending downwardly through the housing 188 to communicate with the space therebelow around the leaf spring 207 and above the upper damper diaphragm 199b. The leaf spring 207 carries a ball member centrally therein to be urged against by the pin head or flange to close the bore 208 to prevent overtravel of the pressure switch PS, FIG. 9, in closing the switch arm 46a to start fill valve closure, upon the pressure vessel 10, FIG. 4, reaching predetermined fill level.

A needle valve 210 extends into a transverse bore 209 in the pilot ring or leaf spring housing 188, with such bore including the needle valve seat therein, and at innermost end such bore joins a bore downwardly from space under the lower diaphragm 211a of the exhaust ring or diaphragm assembly 189.

A port 212 is provided to pass downwardly in the leaf spring housing 188 to communicate with the transversely extending needle valve bore 209 outwardly of the needle valve elements and inwardly of the packed head of the needle valve. A set screw is shown provided in a threaded bore in the leaf spring housing 188, to communicate with the needle valve bore 209 to bear against the stem of the needle valve to maintain it as adjusted. The fluid (instrument air) to the needle valve 210 has passed through a screen or strainer 205 disposed in a cored passage 217 in the exhaust ring 189a of the diaphragm assembly 189, and upstream from the exhaust ring and diaphragm assembly body 189 it has passed through a passage 214 in the pilot body, base or top 183a, between the inlet 215a from the conduit 90a, and an opening through the upper diaphragm 211b of the aforesaid diaphragm assembly 189.

The exhaust ring 189a of the assembly 189 has a transverse port 216 therethrough to communicate with the space just inward thereof, and between the upper and lower diaphragms 211b, 211a. Centrally, the assembly 189 provides a lower disc or plate 218 upon the diaphragm 211a, and spaced thereabove by spacers, an upper, annular plate 219 under the diaphragm 211b. A spring base and valve seat 220 bears upon the upper diaphragm 211b and extends centrally therethrough to be retained by keeper means inwardly of the annular plate 219.

The inlet 215a in the pilot top or housing 188a communicates inwardly with a vertical counterbore 221 with a bore 222 concentric therewithin providing a valve seat for a tandem valve 224 with lower valve element to seat upon the valve seat 220 through the upper diaphragm 211b. A spring 190, within a low pressure or discharge space 225, bears downwardly upon the spring base and valve seat member 220 and upwardly against the pilot base or top body 183a within the discharge space 225. A retaining screw 226 is threadably adjustable into the counterbore 221 and is recessed to receive the upper end of a spring 227 therein, the lower end bearing upon a shoulder provided on the tandem valve 224 the upper seating member thereof.

By adjustment of restriction screw 202 the force exerted by the push rod 182 against the fluid above the diaphragm 199a is dampened so that there is no chatter and intermittent closing and then opening of the bushed bore 208 by the ball valve element carried by the leaf spring 207. The needle valve 210 is so moved to regulate the reduced pressure instrument air that is permitted to enter the space between the upper damper diaphragm 199b and the lower diaphragm 211a, that the fluid in this space is converted to act as a fluid piston. Also the leaf spring 207 is adapted to be raised by the pin 204 in the diaphragm 199b to close off further movement of the diaphragm assembly 211a, 211b at the end of travel to close the pressure switch that actuates switch arm 46a to close the fill valve.

As to the downstream fluid in the space 225, this is supplied instrument air past the upper valve element of the tandem valve 224 to show a predetermined reduced pressure, say 3 p.s.i., with the pressure vessel empty. Then, the travel produced by the fluid piston upon the diaphragm assembly 211a, 211b being known, needle valve adjustments sets the instrument air constituting the fluid piston at such pressure that this travel is obtained, the space 225 fluid thus being pressurized up to say 12 p.s.i. as the pressure sensitive switch PS actuates fill valve closure.

In case of excess pressure in instrument air supply line 90a, 215a lifting tandem valve 224 (as adjusted seated by spring 227 under retaining screw 226), the tendency to build up the low fluid pressure in space 225 is counter-balanced by the fact that the lower valve element of the tandem valve 224 will be lifted off the seat in the valve plate 220 to let the excess fluid bleed off through the plates 219, 218 and out the passage 216.

Referring back to the basic electrical and switch diagram of FIG. 2, as used with an agitator-bottom discharge type pressure as the vessel 310 shown in FIG. 3, a switch 230 is shown connected adjacent to, but separately from the switches 41a, 41b, 41c, from the positive side conductor the circuit 231 of this switch 230 extending to the negative side 72a, 42 of the power circuit. In this case the motor 321 that drives the agitator shaft 324a, FIGS. 13 and 14, may be turned on as desired.

Alternatively, as shown in FIG. 2, the regular fluid flow pump circuitry may be modified in one particular. The switch 230 may be connected to be turned on when the switch 41a, 41b or 41c is turned on. In this case the circuit 231, FIG. 2, will not be used, but rather a circuit 232 from the negative side of the motor 321, shown in dotted lines in FIG. 2, will extend to the negative power line 42, with a normally open switch 233 being shown in such circuit 232, to be closed by the latching relay as it closes normally open switch 56a to open the fill valve. Then the latching relay may be used again, as it opens the purge valve and thus breaks the circuitry to let the switch 56a open, taking pressure off the normally open switch 233 so that it may open.

Details of construction heretofore not identified by reference numerals: a relief valve 31 is shown indicated above the pressure vessel top 12a in FIG. 1; also in FIG. 4; and a relief valve 331 is also shown above the pressure vessel top 312a in FIG. 13. Also, a manhole opening 369 is shown through the side of shell 311 in FIG. 13.

Noticeably, as has been heretofore explained, the frequency sensitive device 37 shown in FIGS. 1, 4, and 13, and in detail in FIG. 3, may be used alternatively to actuate fill valve closure in the forms of invention shown in FIGS. 1 and 2, and in FIGS. 13 and 14, but not in the form of invention shown in FIG. 4, due to the characteristics of the materials adapted to being weighed. However, in all three forms of FIGS. 1 and 2, FIG. 4, and FIGS. 13 and 14, the frequency sensitive device may be used as a "fail-safe" or safeguarding device to serve if the predetermined first means for closing the fill valve does not work.

Obviously, the circuitry shown in FIG. 2, in which the fill valve is closed as a function of time (or of material level); and the circuitry shown in FIG. 9, in which the fill valve is closed as a function of weight, in terms of a pressure signal; may operate with the structural arrangement of FIGS. 13 and 14 as regards bottom discharge, with agitator circuitry of FIG. 9 having the same alternative modification for turning on and off the agitator motor as shown in FIG. 2.

The invention is thus shown as adapted to be practiced through a variety and range of structural variations and circuitry changes as involve manner of closing fill valve, and manner of treatment of material prior to discharge. The invention is thus set forth in exemplary detail and spirit herein, and the appended claims are in outline.

What is claimed is:

1. Material transporting apparatus comprising a pressure vessel including a gas permeable diaphragm bridging the lower part of said vessel above the bottom thereof and dividing it into a material plenum thereabove and a gas plenum therebelow, a fill valve to admit flowable material through the top of said vessel into said material plenum to upstand from said diaphragm, a compressed gas inlet connection including a gas valve into said gas plenum, a discharge connection downwardly through said diaphragm and extending through said gas plenum and including a discharge valve disposed exteriorly of said vessel in said discharge connection, a purge connection from the upper part of said material plenum by-passing said discharge valve and including a purge valve disposed in said purge connection, an agitator including frame means centered above the downward opening of said discharge connection with opening space downwardly therethrough and into said downward opening, said frame means being disposed to sweep the upper surface of said diaphragm and extending into a substantially conical space thereabove, a drive shaft extending upwardly from said frame means to be driven by drive means exteriorly of said vessel, and agitator circuit means to said drive means, said vessel including pressure sensitive control means, and circuitry including said control means and automatically operable sequentially to open said fill valve, to close said fill valve, then to close said purge valve while opening said gas inlet valve to admit pressurized gas substantially uniformly through said diaphragm and to activate said material to a high state as the pressure rises in excess of a predetermined high pressure to actuate said pressure sensitive control means to open said discharge valve for said material to pass downwardly through said discharge valve and outwardly through said discharge connection, the pressure falling below a predetermined lower pressure to actuate said pressure sensitive control means to close said discharge valve and said gas inlet valve and to open said purge valve, the residual compressed gas purging upwardly through said purge valve and through said purge connection and on outwardly through said discharge connection.

2. Material transporting apparatus as claimed in claim 1 in which independent means is provided to turn on and off said agitator circuit means.

3. Material transporting apparatus as claimed in claim 1, in which said circuitry turns on said agitator circuit means at it closes said fill valve, and turns off said agitator means as it opens said purge valve.

4. Material transporting apparatus as claimed in claim 1, in which said diaphragm is an inverted frusto-cone with said frame means including angularly spaced apart, upwardly and outwardly extending sweep members.

5. Material transporting apparatus as claimed in claim 4, in which said sweep members join a circular member at their upper ends.

6. Material transporting means as claimed in claim 4, in which said sweep members are of round tubular cross-section.

7. Material transporting means as claimed in claim 1, in which said drive shaft extends upwardly through a flexible, air-tight seal in the top of said pressure vessel, and in which said drive means comprises an electric motor connected to a gear box to which said drive shaft is connected to be driven.

8. Material transporting means as claimed in claim 1, in which said diaphragm is an inverted frusto-cone with said frame means including angularly spaced apart sweep members extending upwardly and outwardly from said drive shaft.

9. Material transporting means as claimed in claim 7, in which said fill valve admits flowable material through said top off-center and spaced outwardly from said gear box.

10. Material transporting apparatus comprising a pressure vessel, a scale supporting said vessel and after tare weight adjustment being adapted to reflect weight in terms of a pressurized fluid signal therefrom, a gas permeable membrane across said vessel separating a lowermost gas plenum from an uppermost material plenum, a fill valve to admit material batches into said material plenum to be transported, a value controlling pressurized gas entry through a conduit into said gas plenum, a pressure sensitive valve controlled discharge conduit from said material plenum, a purge connection from the upper part of said material plenum by-passing said discharge valve and including a purge valve disposed in said purge connection, and automatically operable circuitry sequentially functional to open said fill valve, to receive said pressure fluid signal, and, as it achieves predetermined intensity, to close said fill valve and then to close said purge valve and to open said pressurized gas valve to activate the material and into a flowable state and to build up a pressure in said vessel, to open said discharge valve whereby said materials are discharged through said discharge conduit, said discharge valve and said gas inlet valve closing responsive to pressure drop and said purge valve opening, and residual compressed gas purging upwardly through said purge valve and said purge connection and on outwardly through said discharge conduit, until upon further pressure drop said apparatus is restored to initial status automatically to repeat the handling of a succeeding batch of material.

References Cited
UNITED STATES PATENTS

| | | | |
|---|---|---|---|
| 1,935,843 | 11/1933 | Goebels | 302—53 |
| 2,032,367 | 3/1936 | Kennedy et al. | 302—53 |
| 2,221,741 | 11/1940 | Vogel-Jorgensen | 302—53 |
| 2,668,085 | 2/1954 | Baresch | 302—53 |
| 3,355,221 | 11/1967 | Reuter | 302—53 |

ANDRES H. NIELSEN, Primary Examiner

U.S. Cl. X.R.

302—3